United States Patent
Huang et al.

(10) Patent No.: US 10,339,413 B2
(45) Date of Patent: Jul. 2, 2019

(54) WARNING SIGN PLACING APPARATUS AND CONTROL METHOD THEREOF

(71) Applicant: Wistron Corporation, New Taipei (TW)

(72) Inventors: Po-Liang Huang, New Taipei (TW); Chia-Chang Hou, New Taipei (TW)

(73) Assignee: Wistron Corporation, New Taipei (TW)

( * ) Notice: Subject to any disclaimer, the term of this patent is extended or adjusted under 35 U.S.C. 154(b) by 92 days.

(21) Appl. No.: 14/705,974

(22) Filed: May 7, 2015

(65) Prior Publication Data

US 2016/0202077 A1    Jul. 14, 2016

(30) Foreign Application Priority Data

Jan. 8, 2015 (TW) .............................. 104100517 A

(51) Int. Cl.
  *G01C 21/34* (2006.01)
  *G06K 9/52* (2006.01)
  *G06K 9/00* (2006.01)
(52) U.S. Cl.
  CPC ........... *G06K 9/52* (2013.01); *G06K 9/00805* (2013.01)
(58) Field of Classification Search
  None
  See application file for complete search history.

(56) References Cited

U.S. PATENT DOCUMENTS

| 6,194,860 | B1 * | 2/2001 | Seelinger | ................. | B25J 5/007 318/586 |
| 2014/0156182 | A1 * | 6/2014 | Nemec | ................... | G05D 1/021 701/430 |
| 2014/0236414 | A1 * | 8/2014 | Droz | ..................... | B60W 30/00 701/28 |
| 2015/0358540 | A1 | 12/2015 | Kanter et al. | | |

(Continued)

FOREIGN PATENT DOCUMENTS

| CN | 102789233 | | 11/2012 |
| CN | 102789233 | A * | 11/2012 |
| CN | 103310715 | | 9/2013 |

(Continued)

OTHER PUBLICATIONS

Translation of CN103310715A (Year: 2013).*

(Continued)

*Primary Examiner* — Hussein Elchanti
*Assistant Examiner* — Paul A Castro
(74) *Attorney, Agent, or Firm* — JCIPRNET

(57) ABSTRACT

A warning sign placing apparatus and a control method thereof are provided. The warning sign placing apparatus includes at least two camera units, a control unit, and a vehicle. The camera unit captures a plurality of images in a preset direction. The vehicle carries at least two camera units and control unit. The control unit identifies a traveling direction of the road and distinguishes at least one object on the road based on the images, and plans a route along the road for the vehicle according to the at least one object, where the vehicle travels along the route. A warning sign is configured in the warning sign placing apparatus and is able to automatically move to a preset position with a preset distance in order to avoid the risk of dangers in a case of manually placing the warning sign.

15 Claims, 8 Drawing Sheets

(56) References Cited

U.S. PATENT DOCUMENTS

2016/0104049 A1* 4/2016 Stenneth .................. G06K 9/72
                                                    382/155

FOREIGN PATENT DOCUMENTS

| CN | 103310715 A | * | 9/2013 |
| CN | 103868519 | | 6/2014 |
| CN | 104181923 | | 12/2014 |
| WO | 2014108560 | | 7/2014 |

OTHER PUBLICATIONS

Translation of CN102789233A (Year: 2012).*
"Office Action of Taiwan Counterpart Application", dated Nov. 24, 2015, with English translation thereof, p. 1-p. 7.
"Office Action of China Counterpart Application," dated Mar. 20, 2018, p. 1-p. 10.
"Office Action of Taiwan Counterpart Application," dated Mar. 20, 2018, p. 1-p. 10.
"Office Action of China Counterpart Application" , dated Mar. 8, 2019, p. 1-p. 10.

* cited by examiner

WARNING SIGN PLACING APPARATUS AND CONTROL METHOD THEREOF

CROSS-REFERENCE TO RELATED APPLICATION

This application claims the priority benefit of Taiwan application serial no. 104100517, filed on Jan. 8, 2015. The entirety of the above-mentioned patent application is hereby incorporated by reference herein and made a part of this specification.

BACKGROUND OF THE INVENTION

1. Field of the Invention

The present invention generally relates to a warning sign placing technique, in particular, to an automatically movable warning sign placing apparatus and a control method thereof.

2. Description of Related Art

A car accident or breakdown may inevitably occur during traveling. The traffic law in each country requires a driver or a culprit to place a car breakdown warning triangle or other highly visible warning equipment at a distance behind the car in order to alert the oncoming cars that a car accident is ahead with an adequate reaction distance so as to prevent another accident.

A common approach is to manually carry the car breakdown warning triangle out from the car and place it behind the car with a certain distance. However, while the driver is carrying the car breakdown warning triangle, the oncoming cars may not be given with an adequate reaction distance to the car accident and may thus collide with the driver. Hence, to safely place a car breakdown warning triangle for a driver during a car accident has become a crucial problem to be solved.

SUMMARY OF THE INVENTION

Accordingly, the present invention is directed to a warning sign placing apparatus and a control method thereof, where a warning sign is configured in the warning sign placing apparatus and the warning sign placing apparatus is able to automatically move to a preset position with a preset distance in order to avoid the risk of dangers in a case of manually placing the warning sign.

The invention is directed to a warning sign placing apparatus including at least two camera units, a control unit, and a vehicle. The camera units are configured to capture a plurality of images in a preset direction. The control unit is coupled to the camera units. The vehicle is configured to carry the camera units and the control unit. The control unit identifies a traveling direction of a road based on the images, distinguishes at least one object on the road, and plans a route along the road for the vehicle according to the at least one object, where the vehicle travels along the route.

According to an embodiment of the invention, the warning sign placing apparatus further includes a storage unit and a receiving unit. The storage unit is coupled to the control unit and is configured to store the route. The receiving unit is coupled to the control unit and is configured to receive a recall signal. The recall signal is used to instruct the control unit for controlling the vehicle to return back along the route.

According to an embodiment of the invention, the control unit distinguishes that the at least one object includes a curb line. The control unit calculates an angle between the curb line and a preset imaginary line and controls a traveling direction of the vehicle according to the angle.

According to an embodiment of the invention, the control unit distinguishes that the at least one object includes at least one obstacle. The control unit calculates obstacle information of the at least one obstacle and plans the route for the vehicle according to the obstacle information.

According to an embodiment of the invention, the control unit stops operating while the vehicle is traveling.

According to an embodiment of the invention, the warning sign placing apparatus further includes a light-emitting unit. The light-emitting unit is coupled to the control unit and has a light-emitting range. The control unit plans the route for the vehicle according to the road within the light-emitting range.

From another viewpoint, the invention is directed to a control method of a warning sign placing apparatus, and the method includes the following steps. A plurality of images are captured by the at least two camera units in a preset direction. A traveling direction of a road is identified based on the images and determining at least one object on the road A route along the road for the vehicle is planned according to the at least one object, wherein the vehicle travels along the route.

Other detailed embodiments of the control method of the warning sign placing apparatus may refer to the previous discussion and may not be repeated herein.

In summary, in the warning sign placing apparatus and the control thereof proposed in the invention, a plurality of images are captured in a preset direction, a traveling direction of the road is identified based on the images, and at least one object on a road is distinguished. A route along the road for the vehicle is planned according to the at least one object so that the vehicle may travel along the planned route in order to avoid the risk of dangers in a case of manually placing the warning sign.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
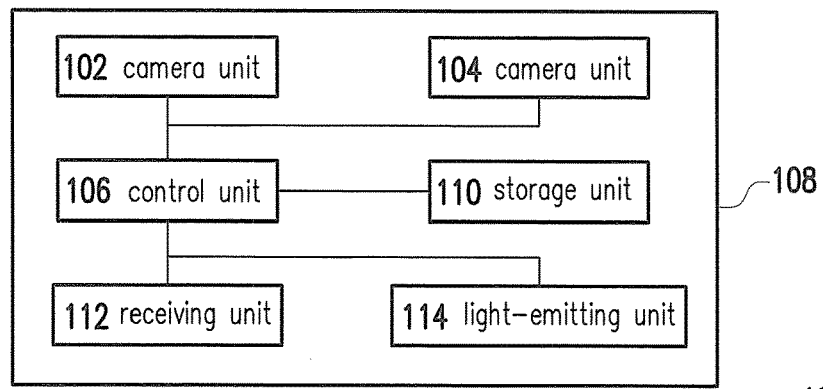
FIG. 1 illustrates a block diagram of a warning sign placing apparatus according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a block diagram of a warning sign placing apparatus according to an embodiment of the invention. Referring to FIG. 1, a warning sign placing apparatus 10 includes two camera units 102 and 104, a control unit 106, and a vehicle 108. A warning sign may be placed on the vehicle 108 in the present embodiment.

The camera units 102 and 104 are configured to capture images in a preset direction. To be specific, the camera units 102 and 104 may capture images in a same direction. For example, the camera units 102 and 104 may be configured at a same side of the vehicle 108, and each of the camera units 102 and 104 may capture a front scene thereof. Moreover, the camera units 102 and 104 may be configured with a distance therebetween. For example, the camera units 102 and 104 may be configured at a same side of the vehicle 108 with a space of 20 cm therebetween. Therefore, the camera units 102 and 104 may have different fields of view. It should be noted that, the camera units 102 and 104 may be configured at different sides or other positions of the vehicle 108. The number, the size, and the arrangement of the camera units are not limited in the invention. The camera units 102 and 104 may be cameras or camcorders with charge coupled device (CCD) lenses, complementary metal oxide semiconductor transistor (CMOS) lenses, or infrared lenses, and yet the invention is not limited thereto.

The control unit 106 is coupled to the camera unit 102 and camera unit 104. The control unit 106 may be a control chip, a microprocessor, or other suitable controllers.

The vehicle 108 is configured to carry the camera unit 102, the camera unit 104, and the control unit 106. The vehicle 108 is also configured to carry the warning sign and may include a substrate and drive elements such as a plurality of motors and wheels. In the present embodiment, the control unit 107 may identify a traveling direction of a road based on the images, distinguish all objects on the road, and plan a route along the road for the vehicle according to the objects. Then, the vehicle is able to travel along the planned route.

In an embodiment of the invention, the warning sign placing apparatus 10 may further include a storage unit 110 and a receiving unit 112, and the storage unit 110 is coupled to the control unit 106. The storage unit 110 is configured to store the route planned by the control unit 106. The storage unit 110 may be a built-in or an external storage unit. The built-in storage unit may be, for example, a random access memory (RAM), a read-only memory (ROM), a flash memory, or a magnetic disk storage device. The external storage unit may be, for example, a compact flash (CF) memory card, a secure digital (SD) memory card, a micro SD memory card, or a memory stick (MS). The receiving unit 112 is coupled to the control unit 106. The receiving unit 112 may be a receiver employing a radio frequency (RF) technology or other wireless technologies. The receiving unit 112 is configured to receive a recall signal. In an embodiment, the recall signal may be used to instruct the control unit 106 for controlling the vehicle 108 to return back along the planned route. From another point of view, the recall signal may be used to instruct the control unit 106 for controlling the vehicle 108 to return back according to the route stored in the storage unit 110.

In an embodiment of the invention, the warning sign placing apparatus 10 may further include a light-emitting unit 114 coupled to the control unit 106. The light-emitting unit 114 may be an infrared light-emitting diode (LED). The light-emitting unit 114 has a light-emitting range and is configured to provide illumination. The type, number, size, and configuration of the limit-emitting unit 144 are not limited in the invention. To be specific, during insufficient ambient light or at night, the light-emitting unit 114 may assist the camera units 102 and 104 in capturing images with clarity. In other words, the images captured by the camera units 102 and 104 within the light-emitting range may have better luminance contrast.

Figure 2A:
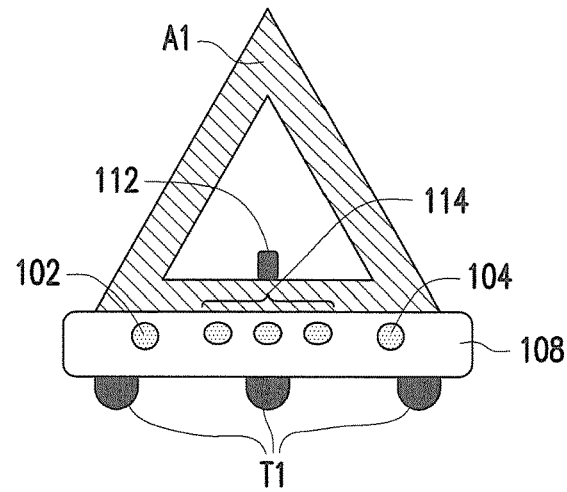
FIGS. 2A-2C illustrate structural schematic diagrams of a warning sign placing apparatus according to an embodiment of the invention.
Figure 2B:
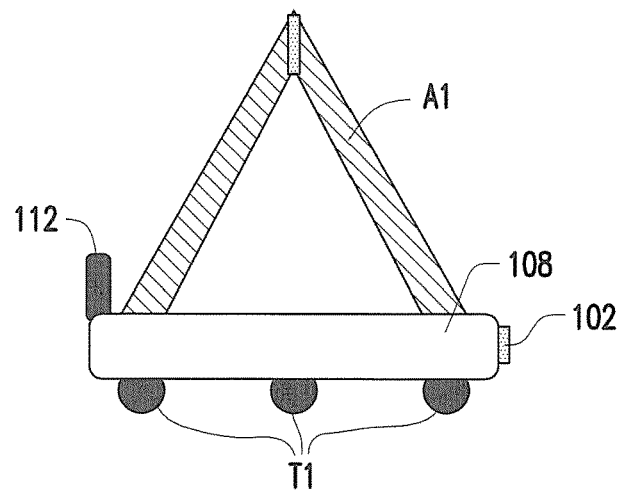
Figure 2C:
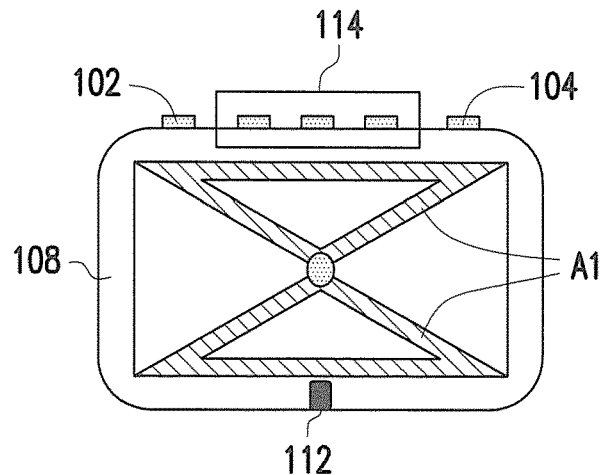

FIGS. 2A-2C illustrate structural schematic diagrams of a warning sign placing apparatus according to an embodiment of the invention. FIG. 2A illustrates a front view diagram of the outer structure of the warning sign placing apparatus. FIG. 2B illustrates a side view diagram of the outer structure of the warning sign placing apparatus. FIG. 2C illustrates a top view diagram of the outer structure of the warning sign placing apparatus. Referring to FIGS. 2A-2C, the outer structure of the sign warning placing apparatus includes the camera unit 102, the camera unit 104, the vehicle 108, the receiving unit 112, the light-emitting unit 114, drive elements T1, and a warning sign A1. It should be noted that, the camera unit 102, the camera unit 104, the vehicle 108, the receiving unit, and the light-emitting unit 114 provide similar or same features as those components with same reference numbers in FIG. 1 and thus their features would not be repeated hereinafter. The drive elements T1 may be a plurality of wheel structures (e.g. steering wheels) driven by a motor. The drive elements T1 are configured at the bottom of the vehicle 108 and may be driven by the control unit 106 to move the vehicle 108. The warning sign A1 may be a car breakdown warning triangle with a plurality of highly emitting elements such as LED. The warning sign A1 may also be a warning sign or a notice board in other forms. The shape, color, size, representation of the warning sign A1 are not limited in the invention. It should be noted that, the outer structure of the warning sign placing apparatus illustrated in the present embodiment is merely an example. Each component of the warning sign placing apparatus 10 may be arranged according to actual usage. The appearance and representation of the warning sign placing apparatus are not limited in the invention.

Figure 3:
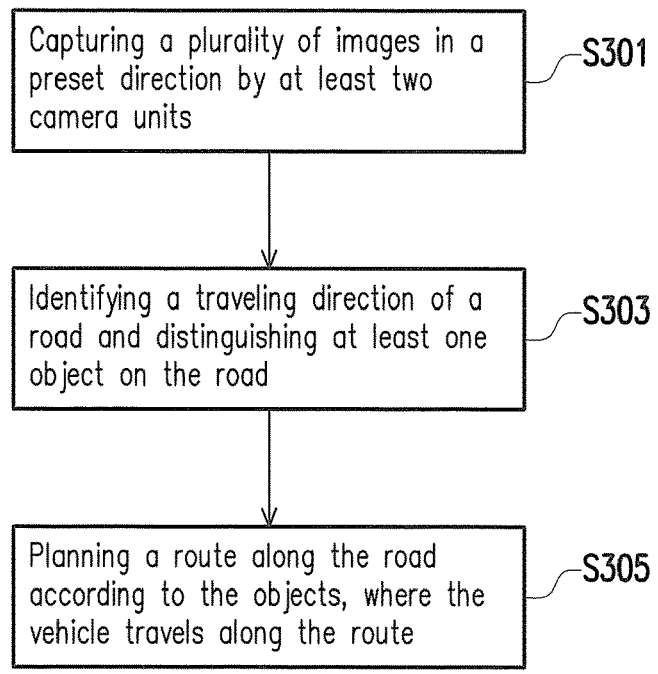
FIG. 3 illustrates a flowchart of a control method of a warning sign placing apparatus according to an embodiment of the invention.

FIG. 3 illustrates a flowchart of a control method of a warning sign placing apparatus according to an embodiment of the invention. Referring to both FIG. 1 and FIG. 3, the user may first place the warning sign placing apparatus 10 on a floor of a car's rear and allow the camera units 102 and 104 to be facing at an opposite direction to a traveling direction of the car. In Step S301, each of the camera units 102 and 104 may capture a plurality of images of a front scene thereof. To be specific, the camera units 102 and 104 may respectively capture the images with different fields of view.

In Step S303, the control unit 106 may identify a traveling direction of a road based on the aforesaid images and distinguish at least one object on the road. For simplicity and illustrative purposes, the at least one object would be plural in the following embodiments. The objects may include road surfaces, curb lines, boundary lines, traffic lines, and obstacles such as holes, pits, or rocks. The types and the patterns of the objects to be distinguished are not limited in the invention. In Step S305, the control unit 106 may plan a route along the road for the vehicle 108 according to the aforesaid objects, where the vehicle may travel along the route.

Figure 4:
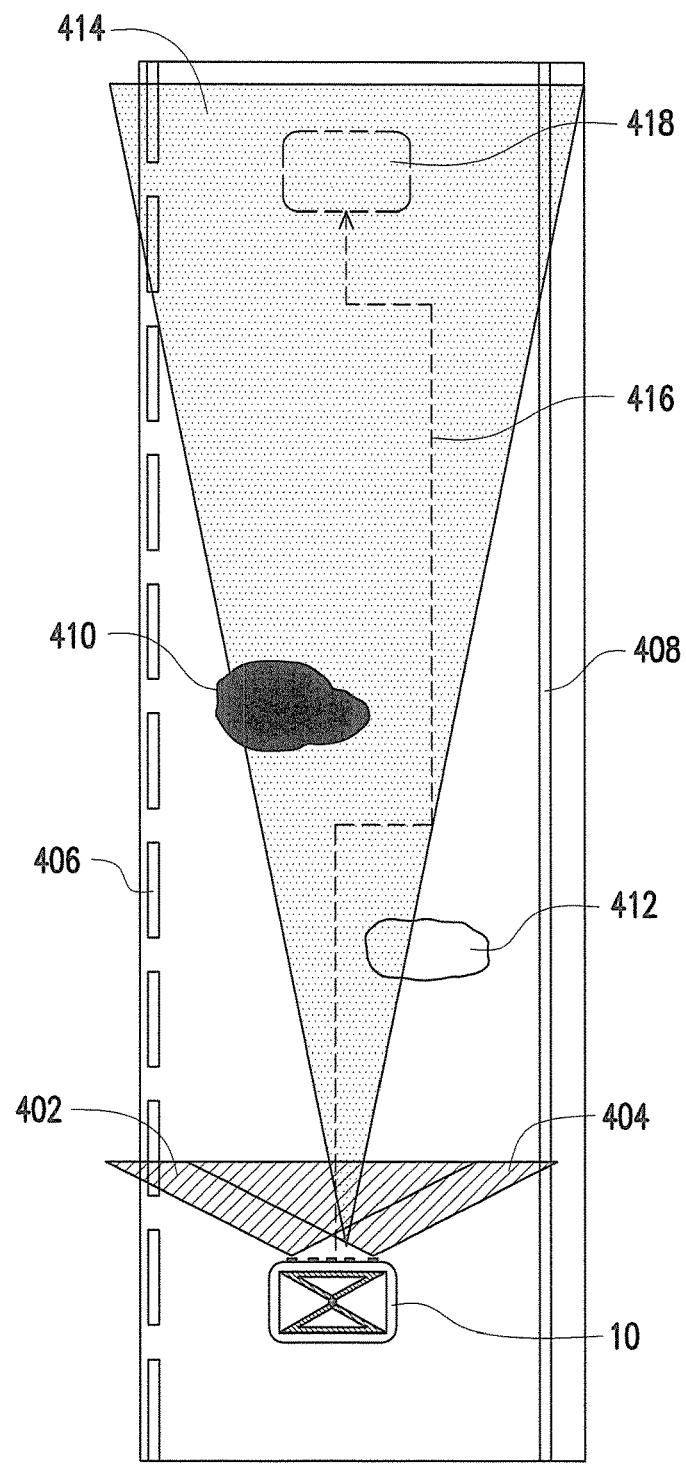
FIG. 4 illustrates a schematic diagram of a control method of a warning sign placing apparatus.

For example, FIG. 4 illustrates a schematic diagram of a control method of a warning sign placing apparatus. Referring to FIG. 4, the schematic diagram includes the warning sign placing apparatus 10, a region 402, a region 404, a boundary line 406, a boundary line 408, an obstacle 410, an obstacle 412, a region 414, a route 416, and a target point 418. The fields of view of the camera units 102 and 104 may respectively be the regions 402 and 404. The light-emitting range of the light-emitting unit 114 may be the region 414. To be specific, the camera units 102 and 104 of the warning sign placing apparatus 10 may respectively capture images within the regions 402 and 404. The control unit 106 of the warning sign placing apparatus 10 may analyze the aforesaid images and distinguish the objects in the images such as the boundary line 406, the boundary line 408, the obstacle 410, and the obstacle 412. The control unit 106 may plan the route 416 for the vehicle 108 according to the aforesaid objects and control the vehicle 108 to travel to the target point 418 to place the warning sign.

In an embodiment, the control unit 106 may determine that the objects include at least one obstacle, calculate obstacle information of the obstacle(s), and plan a route for the vehicle according to the obstacle information.

Figure 5:
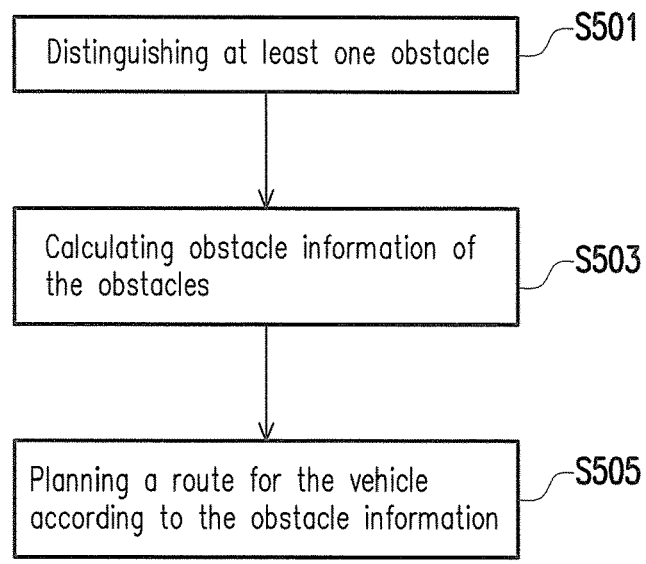
FIG. 5 illustrates a schematic flowchart of distinguishing an obstacle by a warning sign placing apparatus according to an embodiment of the invention.

To be specific, FIG. 5 illustrates a schematic flowchart of distinguishing an obstacle by a warning sign placing apparatus according to an embodiment of the invention. Referring to FIG. 5, in Step S501, the control unit 106 may distinguish that the objects include at least one obstacle, where the obstacle(s) may include rocks protruding from a road, or holes and pits on the road. For simplicity and illustrative purposes, the at least one obstacle would be plural in the following embodiments. In Step S503, the control unit 106 may calculate obstacle information of the obstacles. Since the reflectivity of each object is different, all the objects in the images may be presented in different variations of luminance contrast. Different objects may be determined by analyzing the images with different fields of view according to color blocks presented therein. Moreover, information such as size, shape, position, and depth of each color block may be calculated by using triangulation calculation. Hence, the obstacle information may be, for example, information such as the cross-sectional areas, the sizes, the shapes, the positions, and the depths of the objects, and yet the obstacle information is not limited thereto. In Step S505, the control unit 106 may plan a route for the vehicle 108 according to the obstacle information. The warning sign placing apparatus 10 may avoid all adverse conditions along the road and arrive at a position with a suitable safety distance.

Figure 6:
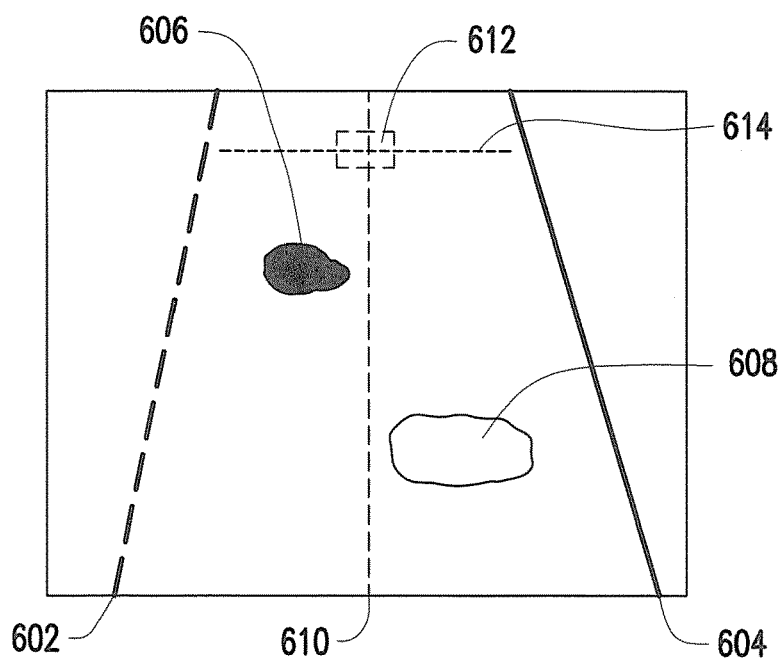
FIG. 6 illustrates a schematic image of determining obstacles by a warning sign placing apparatus according to an embodiment of the invention.

For example, FIG. 6 illustrates a schematic image of determining obstacles by a warning sign placing apparatus according to an embodiment of the invention. Referring to FIG. 6, the schematic image includes a boundary line 602, a boundary line 604, an obstacle 606, an obstacle 608, a preset imaginary line 610, a target point 612, and a line segment 614. To be specific, after the control unit 106 may analyze different images with different fields of view, it may identify all the objects such as the boundary line 602, the boundary line 604, the obstacle 606, and the obstacle 608 and further distinguish the obstacle 606 and the obstacle 608 among the determined objects. The control unit 106 may calculate obstacle information of the aforesaid obstacles. For example, a same obstacle may be calculated based on triangulation according to the images with different fields of view to obtain the depth of the obstacle. The control unit 106 may also obtain the length and width distances of the obstacle through image analysis and calculate the coordinate of the obstacle with respect to the vehicle accordingly. Lastly, the control unit 106 may plan a route for the vehicle 108 according to the obstacle information.

In an embodiment, the control unit 106 may define a target point and plan a route according to the target point. To be specific, such target point may be a position on a road at which the warning sign placing apparatus 10 would be placed. The target point 612 may be set in the image by the camera units 102 and 104, or the control unit 106. For example, referring to FIG. 6, the preset imaginary line 610 may be a central axis of the image or a middle line between the boundary line 602 and the boundary line 604. Also, the line segment 614 is between the boundary line 602 and the boundary line 604. The depth of the line segment 614 in the image may correspond to a position with a suitable safety distance where the warning sign placing apparatus 10 would be placed. In other words, the control unit 106 may set the target point 612 according to the preset imaginary line 610 and the line segment 614. For example, the target point 612 may be set at an intersection of the preset imaginary line 610 and the line segment 614. The target point 612 may also be set at any position on the line segment 614. In other words, the warning sign placing apparatus 10 may set the current position as a starting point and the target point 612 as a destination for route planning.

It should be noted that, the number of the target point is not restricted to one. The warning sign placing apparatus 10 may execute the aforesaid flow by segments, move to each target point of the segments, and arrive at a position with a suitable safety distance. For example, when the planned route is on a curved road, the warning sign placing apparatus 10 may execute the aforesaid flow repeatedly, move to a target point in each segment, and arrive at a position with a suitable safety distance.

In an embodiment, the control unit 106 may plan a route for the vehicle according to a road within the light-emitting range of the light-emitting unit 114. The present embodiment may be applicable during insufficient ambient light or at night, and yet the invention is not limited thereto. To be specific, the planned route is more accurate when the images including the objects to be distinguished are clearer. The camera units 102 and 104 may obtain the images with better luminance contrast on the road within the light-emitting range. Moreover, the control unit 106 may define the length and range of the route according to the light-emitting range. To be specific, the range outside of the light-emitting range in the image may be completely dark, and thus the control unit 106 may plan the route within the visible range. For example, the length of the route planned by the control unit 106 may be equal to a light-emitting distance. The range of the route planned by the control unit 106 may be equal to the light-emitting range.

Figure 7:
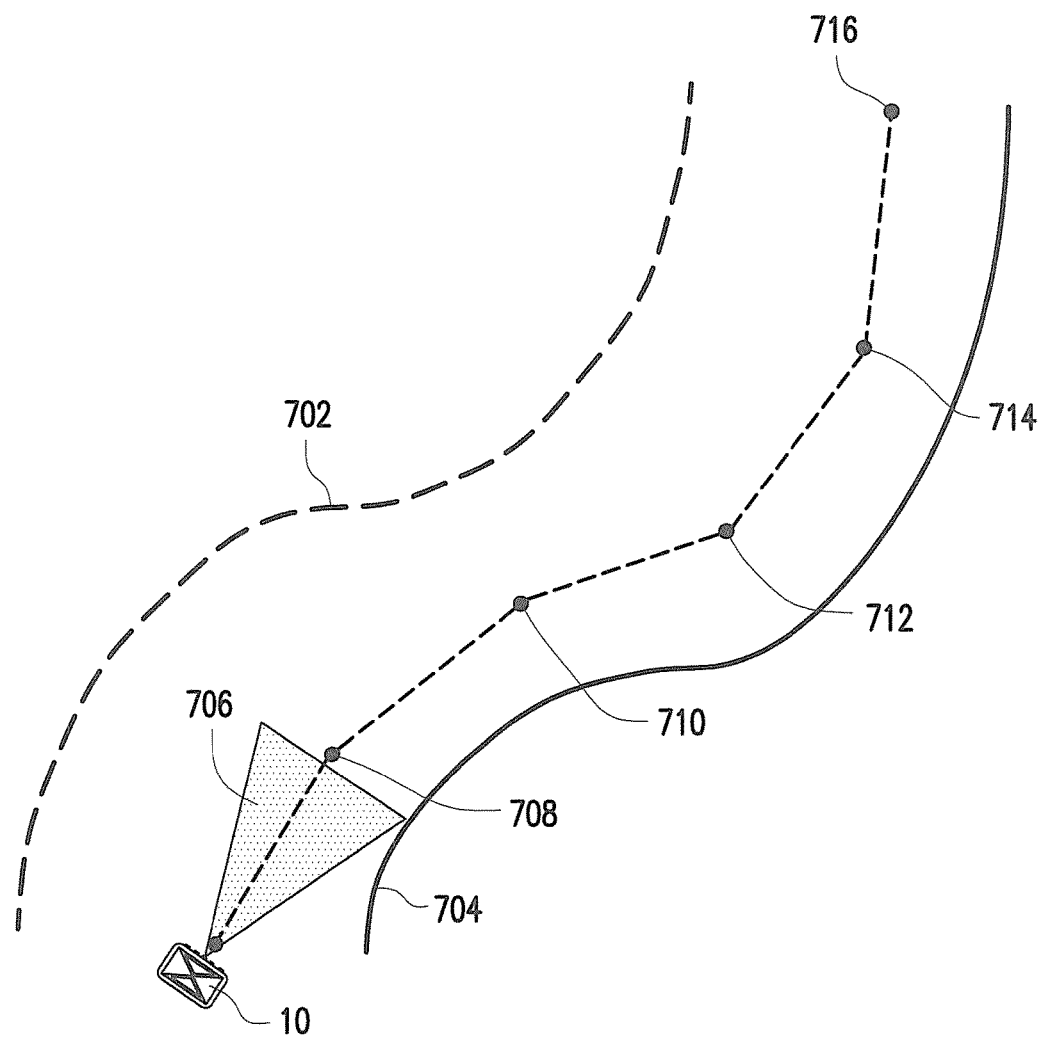
FIG. 7 illustrates a schematic diagram of a control method of a warning sign placing apparatus.

For example, FIG. 7 illustrates a schematic diagram of a control method of a warning sign placing apparatus. Referring to FIG. 7, the schematic diagram includes the warning sign placing apparatus 10, a boundary line 702, a boundary line 704, a region 706, a target point 708, a target point 710, a target point 712, a target point 714, and a target point 716, where the light-emitting range of the light-emitting unit 114 of the warning sign placing apparatus 10 may be the region 706. To be specific, the control unit 106 may set each preset distance segment according to the light-emitting range and set the target points 708, 710, 712, 714, and 716 according to the preset distance segments. For example, the light-emitting range may be 5 m, and thus each of the preset distance segments may also be 5 m. That is, a target point is set every 5 m.

After the aforesaid method is repeatedly executed, the warning sign placing apparatus 10 may arrive at a position with a suitable safety distance of 25 m, i.e. the target point 716.

It should be noted that, the control unit 106 may stop operating while the vehicle 108 is traveling. To be specific, the control unit 106 may enter its sleep state after transmitting the route to the vehicle 108 so as to save the power. The control unit 106 may enter its start-up state after the vehicle 108 arrives at the target point. Moreover, the control unit 106 may enter its start-up state after receiving a recall instruction.

In an embodiment, the control unit 106 may identify that the distinguished objects include a curb line. The control unit 106 may calculate an angle between the curb line and a preset imaginary line and control a traveling direction of the vehicle 108 according to the angle. To be specific, the curb line may include a lane line, a lane/road curb line, and a lane boundary. It may be a solid line, a dashed line, or a boundary between two different road surfaces. The curb line may be configured to define the range for planning a route. The preset imaginary line may also be configured to plan a route. The preset imaginary line may be set in the images by the camera units 104 and 106 or by the control unit 106. There may also be plural preset imaginary lines extended from each road surface with different quantities and spacing intervals. The preset imaginary lines may be solid lines or dashed-lines. The number, the width, the size, the color, and the pattern of the preset imaginary lines are not limited herein. The control unit 106 may calculate all angles between the curb line and the predetermined imaginary lines so as to determine the traveling direction of the vehicle 108.

Figure 8:
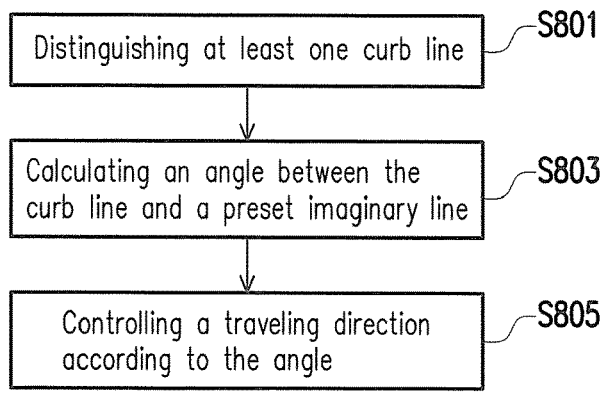
FIG. 8 illustrates a schematic flowchart of determining a travelling direction by a warning sign placing apparatus.

FIG. 8 illustrates a schematic flowchart of determining a travelling direction by a warning sign placing apparatus. Referring to FIG. 8, in Step S801, the control unit 106 may compare images and identify that the distinguished objects include a curb line. In Step S803, the control unit 106 may calculate an angle between the curb line and the preset imaginary line, and thereby obtain a traveling direction of the warning sign placing apparatus 10. In Step S805, the control unit 106 may control the traveling direction of the warning sign placing apparatus 10. Hence, the control unit 106 may prevent the warning sign placing apparatus 10 from crossing over the curb line and affecting the cars on other lanes. Moreover, the flow for determining the traveling direction may be repeated if necessary.

It should be noted that, the control unit 106 may determine whether to adjust the traveling direction in advance according to the angle. To be specific, while the user is placing the warning sign placing apparatus 10, the placement position of the warning sign placing apparatus 10 may be shifted due to road conditions such as a wet, a rising, or a decline road surface and thereby affect the captured images and the route planned by the control unit 106. The control unit 106 may identify the current direction to which the camera units 102 and 104 are facing and determine whether the information captured in the images is sufficient for route planning so as to decide whether to adjust the traveling direction of the vehicle 108. When the control unit 106 determines that the information captured in the images is not sufficient for route planning, the control unit 106 would adjust the traveling direction of the vehicle 108 according to the angle. When the control unit 106 determines that the information captured in the images is sufficient for route planning, the control unit 106 would not adjust the traveling direction of the vehicle 108. For example, when the control unit 106 determines that the angle between the boundary line and the preset imaginary line is less than a preset threshold, it indicates that the warning sign placing apparatus 10 is facing towards a direction which is parallel to the lane, and thus the traveling direction of the warning sign placing apparatus 10 would not be adjusted. In other words, when the control unit 106 determines that the angle between the boundary line and the preset imaginary line is not less than the preset threshold, it represents that the camera units of the warning sign placing apparatus 10 may be facing towards, for example, the lane or the boundary line. The captured images of the warning sign placing apparatus 10 in this case does not provide sufficient information for route planning such as a placement of a target point. Hence, the control unit 106 may control the vehicle 108 to adjust the orientation of the vehicle 108 based on the aforesaid angle. For example, the control unit 106 may rotate the vehicle 108 so that the camera units 102 and 104 are facing towards the target point.

Figure 9A:
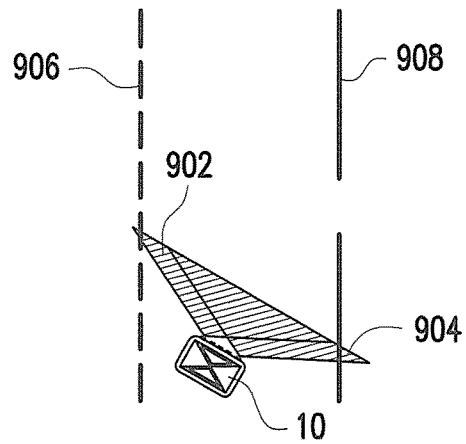
FIG. 9A and FIG. 9B illustrate schematic diagrams of a road while a warning sign placing apparatus is determining a traveling direction according to an embodiment of the invention.
Figure 9B:
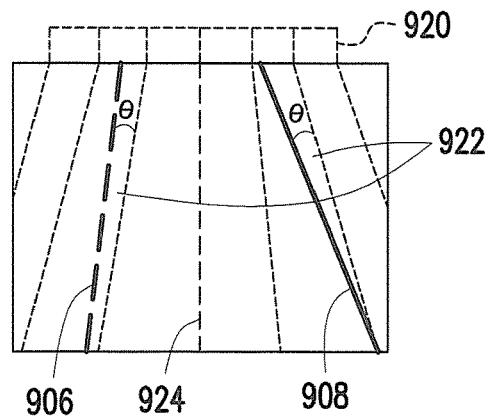

For example, FIG. 9A and FIG. 9B illustrate schematic diagrams of a road while a warning sign placing apparatus is determining a traveling direction according to an embodiment of the invention. FIG. 9A illustrates a schematic diagram of a scene which the warning sign placing apparatus 10 is facing toward. Referring to FIG. 9A, the schematic diagram includes the warning sign placing apparatus 10, a region 902, a region 904, a curb line 906, and a curb line 908, where the fields of view of the camera units 102 and 104 may respectively be the region 902 and the region 904. FIG. 9B illustrates a schematic diagram of an image to be determined by the warning sign placing apparatus 10 illustrated in FIG. 9A. Referring to FIG. 9B, the schematic diagram includes the curb line 906, the curb line 908, a plurality of preset imaginary lines 920 and an angle 922, where a preset imaginary line 924 is a central axis of the image. To be specific, the control unit 106 may identify the curb line 906 and curb line 908. The control unit 106 may calculate that the angle 922 between the curb line 906 and the preset imaginary line 920 and the angle 922 between the curb line 908 and the preset imaginary line 920 are θ. The control unit 106 may control the traveling direction of the vehicle 108 according to the angle 922 (i.e. θ). In the present embodiment, the control unit 106 may control the vehicle 108 to rotate according to the angle 922 (i.e. θ) so that the camera units are facing toward a direction which is parallel to the lane.

Figure 10A:
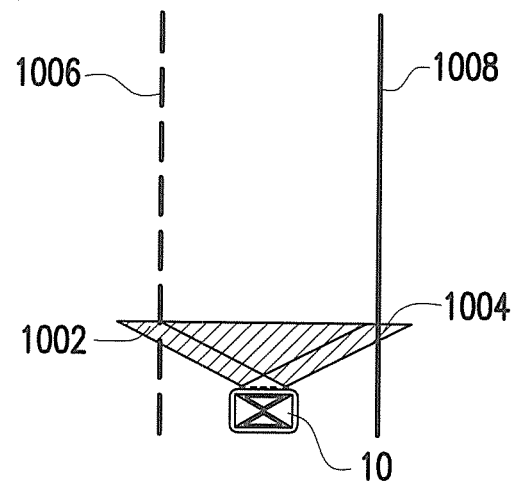
FIG. 10A and FIG. 10B illustrate schematic diagrams of a road while a warning sign placing apparatus is determining a traveling direction according to an embodiment of the invention.
Figure 10B:
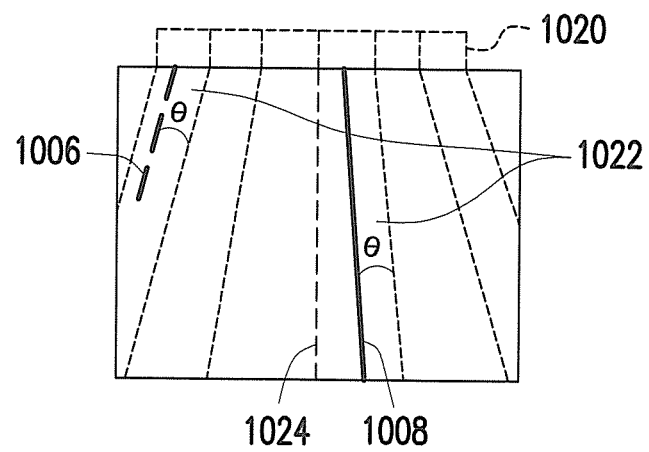

FIG. 10A and FIG. 10B illustrate schematic diagrams of a road while a warning sign placing apparatus is determining a traveling direction according to an embodiment of the invention. FIG. 10A illustrates a schematic diagram of a scene which the warning sign placing apparatus 10 is facing toward. Referring to FIG. 10A, the schematic diagram includes the warning sign placing apparatus 10, a region 1002, a region 1004, a curb line 1006, and a curb line 1008, where the fields of view of the camera units 102 and 104 may respectively be the region 1002 and the region 1004. FIG. 10B illustrates a schematic diagram of an image to be determined by the warning sign placing apparatus 10 illustrated in FIG. 10A. Referring to FIG. 10B, the schematic diagram includes the curb line 1006, the curb line 1008, a plurality of preset imaginary lines 102, and an angle 1002, where a preset imaginary line 1024 is a central axis of the image. To be specific, the control unit 106 may identify the curb line 1006 and the curb line 1008. The control unit 106 may calculate that the angle 1022 between the curb line 1006 and the preset imaginary line 1020 and the angle 1022 between the curb line 1008 and the preset imaginary line 1020 are θ. The control unit 106 may control the traveling direction of the vehicle 108 according to the angle 1022 (i.e. θ). In the present embodiment, the control unit 106 may determine that the information in the images captured by the camera units is sufficient for route planning according to the angle 1022 (i.e. θ), and thus the traveling direction of the vehicle 108 may not need to be adjusted in advance.

It should be noted that, traffic lines on some roads may not be clearly presented, and thus curb lines may be distinguished by comparing the luminance of color blocks in an image. To be specific, the reflectivity of different materials of road surfaces, such as a blacktop road surface, a brick sidewalk, a lawn, or a concrete road surface, may be different. Hence, the color blocks with different luminance contrast may be presented in the image, where the boundary between different color blocks may be identified as the curb lines.

Figure 11A:
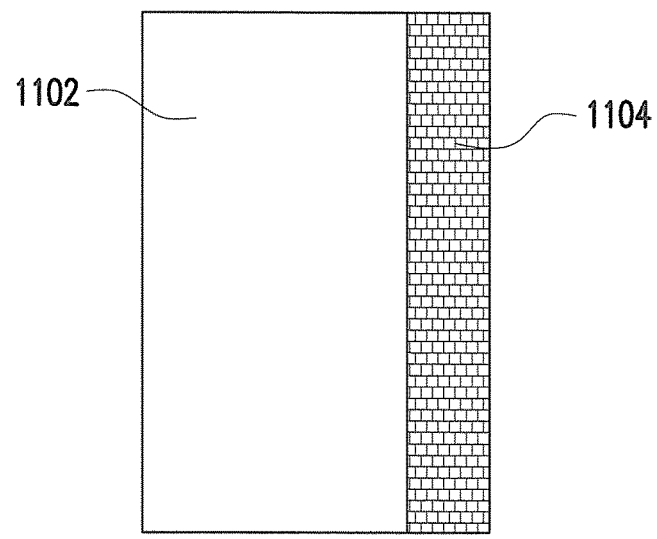
FIG. 11A and FIG. 11B illustrate schematic diagrams of a road while a warning sign placing apparatus is determining a curb line according to an embodiment of the invention.
Figure 11B:
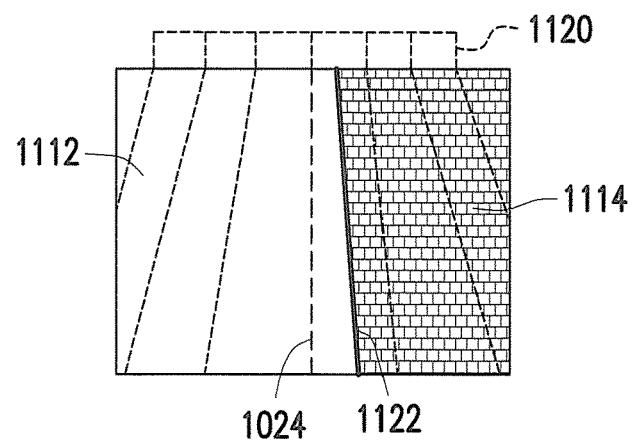

For example, FIG. 11A and FIG. 11B illustrate schematic diagrams of a road while a warning sign placing apparatus is determining a curb line according to an embodiment of the invention. FIG. 11A illustrates a schematic diagram of road surfaces. The schematic diagram includes a road surface 1102 and a road surface 1104. The road surface 1102 may be a blacktop road surface, and the road surface 1106 may be a brick sidewalk. FIG. 11B illustrates a schematic diagram of an image extracted from the road scene in FIG. 11A. The schematic diagram includes a color block 1112, a color block 1114, a plurality of preset imaginary lines 1120, and a boundary line 1122, where the road surface 1102 in FIG. 11A corresponds to the color block 1112, and the road surface 1104 corresponds to the color block 1114. The boundary line 1122 may be obtained by identifying the boundary of the two color blocks. Hence, the curb line may still be identified when there exists no clear traffic lines.

In view of the foregoing, in the warning sign placing apparatus and the control thereof proposed in the invention, images are captured by using at least two lenses, objects in the images are identified, and a traveling route of the warning sign placing apparatus is planned. Accordingly, the warning sign placing apparatus would automatically move to a position with a suitable safety distance according to the route, and people's safety would be ensured. The warning sign placing apparatus in the invention may distinguish curb lines and obstacles from the images as well as calculate obstacle information, and thus it may automatically move to a preset distance for placement in any weather or road conditions based on artificial intelligence. Moreover, the warning sign placing apparatus in the invention may also receive a recall signal and return back along the original route to ensure people's safety.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A warning sign placing apparatus comprising:
a warning sign equipment;
at least two camera units, capturing a plurality of images in a preset direction, wherein the at least two camera units have at least two different fields of view;
a control unit, coupled to the at least two camera units; and
a vehicle, having drive elements and carrying the warning sign equipment, the at least two camera units and the control unit,
wherein the warning sign placing apparatus is initially placed within a car,
wherein the control unit identifies a traveling direction of a road based on the images captured by the at least two camera units, distinguishes at least one object on the road, plans a route from the car to a target point along the road for the vehicle according to the at least one object, and controls the vehicle to travel along the route away from the car to place the warning sign equipment at the target point through the drive elements,
wherein the control unit enters its sleep state after transmitting the route to the vehicle, and the vehicle travels along the route by itself.

2. The warning sign placing apparatus according to claim 1 further comprising:
a storage unit, coupled to the control unit and storing the route; and
a receiving unit, coupled to the control unit and receiving a recall signal, wherein the recall signal is used to instruct the control unit for controlling the vehicle to return back along the route.

3. The warning sign placing apparatus according to claim 1, wherein the control unit distinguishes that the at least one object comprises a curb line sensed by the at least two camera units, and wherein the control unit calculates an angle between the curb line and a preset imaginary line and controls a traveling direction of the vehicle according to the angle.

4. The warning sign placing apparatus according to claim 1, wherein the control unit distinguishes that the at least one object comprises at least one obstacle, and wherein the control unit calculates obstacle information of the at least one obstacle and plans the route for the vehicle according to the obstacle information.

5. The warning sign placing apparatus according to claim 1 further comprising:
a light-emitting unit, coupled to the control unit and having a light-emitting range, wherein the control unit plans the route for the vehicle according to the road within the light-emitting range.

6. The warning sign placing apparatus of claim 5, wherein the control unit defines a plurality of preset distance segments on the road according to the light-emitting range, and sets a plurality of target points according to the preset distance segments to plan the route of the vehicle.

7. The warning sign placing apparatus of claim 1, wherein the obstacle information of the at least one obstacle includes at least one of a reflectivity to light of the at least one obstacle and a color block of the at least one obstacle presented in the images.

8. The warning sign placing apparatus according to claim 1, wherein the road is a curved road, and after the vehicle travels to a target point along the route, the control unit identifies a new traveling direction of a road based on a plurality of new images captured by the at least two camera units and the vehicle travels to the next target point in accordance with the curved road.

9. The warning sign placing apparatus according to claim 1, wherein the control unit detects the boundary line according to a boundary of a plurality of different color blocks in the images.

10. A control method of a warning sign placing apparatus, wherein the warning sign placing apparatus comprises a warning sign equipment, at least two camera units and a vehicle, wherein the vehicle has drive elements and carries the warning sign, the at least two camera units, and the control unit, and wherein the method comprises:
   placing the warning sign placing apparatus within a car;
   capturing a plurality of images in a preset direction by the at least two camera units;
   identifying a traveling direction of a road and distinguishing at least one object on the road based on the images captured by the at least two camera units; and
   planning a route from the car to a target point along the road for the vehicle according to the at least one object; and
   controlling the vehicle to travel along the route away from the car to place the warning sign equipment at the target point through the drive elements,
   wherein the control unit enters its sleep state after transmitting the route to the vehicle, and the vehicle travels along the route by itself.

11. The method according to claim 10 further comprising:
   storing the route; and
   receiving a recall signal, wherein the recall signal is used to instruct for controlling the vehicle to return back along the route.

12. The method according to claim 10, wherein the step of planning the route for the vehicle on the road according to the at least one object comprises:
   distinguishing that the at least one object comprises a curb line sensed by the at least two camera units; and
   calculating an angle between the curb line and a preset imaginary line, and controlling a traveling direction of the vehicle according to the angle.

13. The method according to claim 10, wherein the step of planning the route along the road for the vehicle according to the at least one object comprises:
   distinguishing that the at least one object comprises at least one obstacle; and
   calculating obstacle information of the at least one obstacle, and planning the route for the vehicle according to the obstacle information.

14. The method according to claim 10 further comprising:
   planning the route for the vehicle according to the road within the light-emitting range.

15. A warning sign placing apparatus comprising:
   a warning sign equipment;
   at least two camera units, capturing a plurality of images in a preset direction, wherein the at least two camera units have at least two different field of view;
   a control unit, coupled to the at least two camera units; and
   a vehicle, having drive elements, and carrying the warning sign equipment, the at least two camera units and the control unit,
   wherein the warning sign placing apparatus is initially placed within a car,
   wherein the control unit identifies a traveling direction of a road based on the images captured by the at least two camera units, distinguishes at least one object on the road, plans a route from the car to a target point along the road for the vehicle according to the at least one object, and controls the vehicle to travel along the route away from the car to place the warning sign equipment at the target point through the drive elements;
   a memory, coupled to the control unit and storing the route; and
   a receiver, coupled to the control unit and receiving a recall signal, wherein the recall signal is used to instruct the control unit for controlling the vehicle to return back to the car from the target point along the route,
   wherein the control unit enters its sleep state after transmitting the route to the vehicle, and the vehicle travels along the route by itself.

* * * * *